United States Patent [19]

Nakayama et al.

[11] Patent Number: 4,726,542
[45] Date of Patent: Feb. 23, 1988

[54] REEL POSITION-DETECTING DEVICE

[75] Inventors: Norio Nakayama, Hadano; Kiyosi Kimura, Ebina; Yoshikazu Komatsu, Atsugi, all of Japan

[73] Assignee: Anritsu Corporation, Tokyo, Japan

[21] Appl. No.: 899,933

[22] Filed: Aug. 25, 1986

[30] Foreign Application Priority Data

Aug. 29, 1985 [JP] Japan .................. 60-188526

[51] Int. Cl.$^4$ .............................. G11B 15/32
[52] U.S. Cl. ........................ 242/186; 242/57
[58] Field of Search ............. 242/179, 186, 188, 195, 242/56 R, 57, 58.6; 360/95

[56] References Cited

U.S. PATENT DOCUMENTS

| 4,502,647 | 3/1985 | Zweighaft et al. | 242/191 |
| 4,550,884 | 11/1985 | Permut et al. | 242/189 |
| 4,557,435 | 12/1985 | Reishus | 242/190 |
| 4,566,652 | 1/1986 | Permut | 242/189 |
| 4,570,876 | 2/1986 | Andoh et al. | 242/57 X |
| 4,577,811 | 3/1986 | Bray et al. | 242/195 |

Primary Examiner—David Werner
Attorney, Agent, or Firm—Frishauf, Holtz, Goodman & Woodward

[57] ABSTRACT

A reel position-detecting device for use in a magnetic tape drive unit, designed to determine whether or not a supply reel has been positioned upside down in a retainer. When reel-detecting means detects that the supply reel has been set in the retainer, the retainer is rotated in the opposite direction to the tape-supply direction. If tape supply-detecting means detects the magnetic tape and then ceases to detect the tape within a predetermined period, processing means determines that the supply reel has been correctly positioned. Otherwise, the processing means determines that the supply reel has been positioned upside down.

25 Claims, 8 Drawing Figures

REEL POSITION-DETECTING DEVICE

BACKGROUND OF THE INVENTION

The present invention relates to a reel position-detecting device for use in a magnetic tape drive unit, and more particularly to a reel position-detecting device for detecting that a tape supply reel has been mistakenly set upside down in a retainer.

Magnetic tape drive units (the recording medium) have been widely used as the external memories of computers. Among these units is a so-called automatic loading magnetic tape unit in which the outer end portion of the magnetic tape wound around a supply reel is guided by high-pressure air to a takeup reel and is automatically wound around the takeup reel. This unit comprises a retainer provided in a tape supply section, and a tape path extending from the retainer to a tape takeup section. When a supply reel is set in the retainer, the retainer rotates in the opposite direction to the tape-supplying direction. Two nozzles are provided, with the retainer interposed between them. These nozzles eject high-pressure air into the tape path. The high-pressure air flow in the tape path draws the outer end portion of the magnetic tape from the supply reel and causes this portion of the tape to extend through the tape path.

A detector means for detecting the outer end of the magnetic tape is provided near the retainer and in the tape path. It can be, for example, a photo-interrupter. When the detector means detects the outer end of the tape, the retainer is rotated in the forward direction, thereby guiding the outer end of the tape into the tape path. Another nozzle is provided within the tape path, for ejecting high-pressure air to the tape takeup section. The air ejected from this nozzle guides the outer end portion of the tape through the tape path to the takeup section.

The tape takeup section has a hub for taking up the magnetic tape. The hub has a slot through which air is sucked into the hub. Hence, when the outer end of the tape reaches the hub, it is sucked into the hub through the slot. While the hub is rotating in this condition, the outer end portion of the tape is wound around the hub. The roll of magnetic tape is thereby automatically loaded in the magnetic tape drive unit.

Since the supply reel has no marks to help a user distinguish one side of the reel from the other, the user often mistakenly sets the supply reel upside down in the retainer. When the supply reel is placed upside down, the outer end portion of the tape extends and bends in the opposite direction, failing to peel off the supply reel, turning many times in one position, or frictionally contacting the inner surface of the tape path and thus being damaged. To make matters worse, the fact that the supply reel has been set upside down is often noticed too late. By then, the tape is usually in a disordered condition when the user becomes aware of his or her error, and it then requires much time and effort to set the supply reel in the correct position.

SUMMARY OF THE INVENTION

Accordingly, the object of this invention is to provide a device for quickly detecting when a magnetic tape supply reel has been set upside down in a retainer, and also to provide a magnetic tape drive unit having this device.

The inventors hereof have found that a magnetic tape is in a specific state while it is being taken up from a supply-reel, provided the supply reel has been correctly set in the retainer. In the present invention, use is made of means which can detect whether or not the tape is in this specific state and can thus detect when the supply reel has been positioned upside down.

According to the present invention, a reel position-detecting device is provided for use in a magnetic tape drive unit wherein magnetic tape is automatically taken up from a supply reel set in a retainer, to a takeup section, said device being designed for detecting that the supply reel has been mistakenly set upside down in a retainer, and comprising:

reel-detecting means for detecting whether or not the supply reel has been set in the retainer, and for generating a reel-detection signal upon detecting that the supply reel has been set in the retainer;

tape supply-detecting means provided near the retainer and in a tape path extending from the retainer to the takeup section, for detecting whether or not the magnetic tape is being supplied through the tape path, and for generating a tape-detecting signal upon detecting that the magnetic tape is being supplied through the tape path;

reel drive means for rotating the retainer, thereby rotating the supply reel set in the retainer; and processing means responsive to the reel-detecting signal, for controlling the reel drive means, to rotate the retainer in such a direction that the magnetic tape is taken up by the supply reel; for determining that the supply reel has been positioned correctly, when the tape detection signal disappears within a predetermined period as the retainer is rotated; and for determining that the supply reel has been positioned upside down, when the tape detection signal persists beyond said period.

DETAILED DESCRIPTION OF THE PREFERRED EMBODIMENTS

Figure 1:
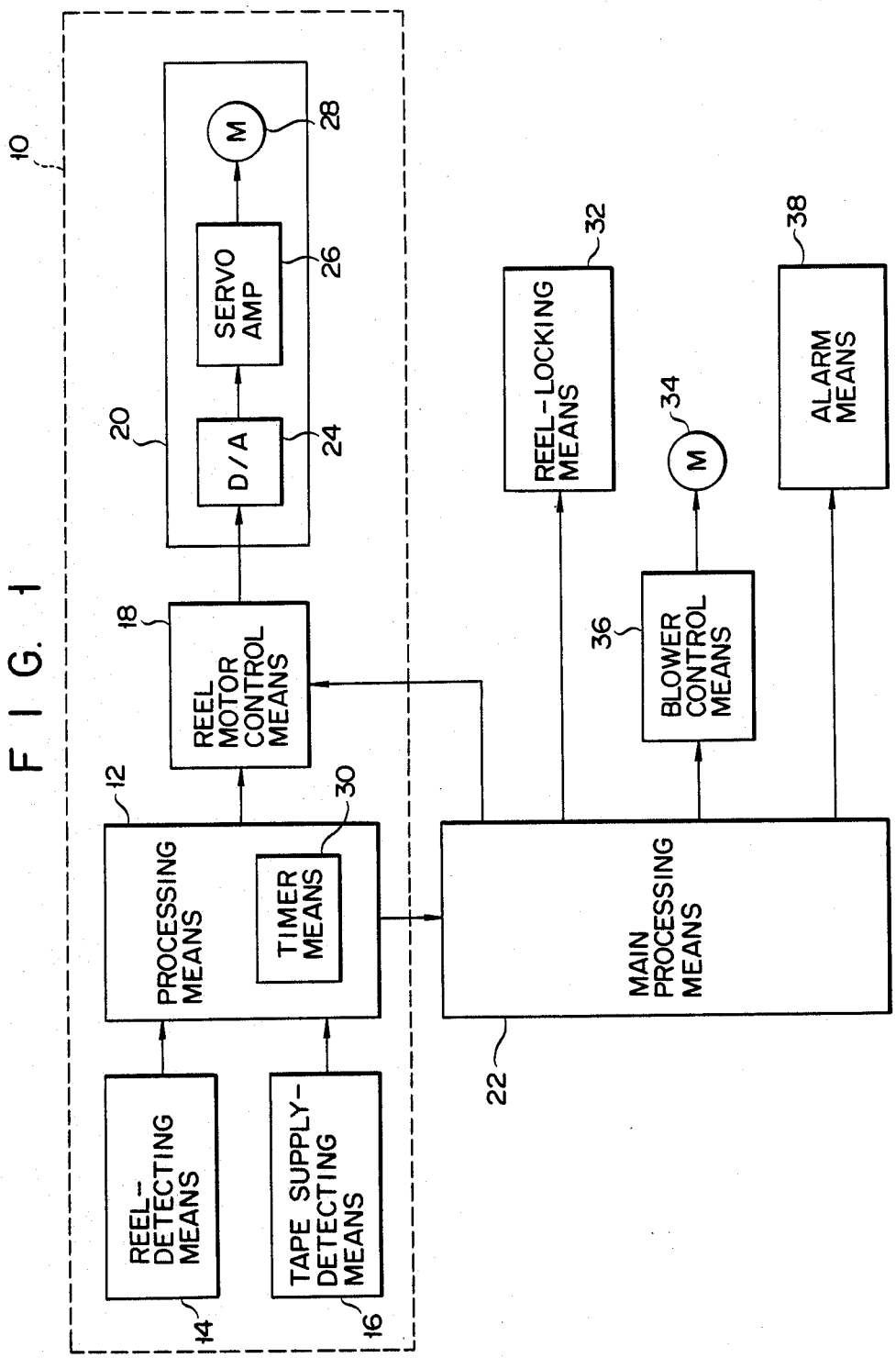
FIG. 1 is a block diagram of a magnetic tape drive unit provided with a reel position-detecting device of this invention, for detecting whether the tape supply reel has been positioned upside down.

One embodiment of the invention will now be described with reference to the drawings attached hereto. FIG. 1 is a block diagram of a magnetic tape drive unit having reel position-detecting device 10 for detecting when a tape supply reel has been positioned upside down. Device 10 has processing means 12, reel-detecting means 14, tape supply-detecting means 16, reel motor control means 18, and reel drive means 20. Means 12 responds to the outputs of reel-detecting means 14 and tape supply-detecting means 16, thereby supplying a control signal to reel motor control means 18 and another control signal to main processing means 22 of the magnetic tape drive unit. In response to the control signal from processing means 12, reel motor control means 18 controls reel drive means 20. Reel drive means 20 comprises D/A (digital/anolog) converter 24, servo amplifier 26, and reel drive motor 28. Motor 28 is under the control of reel motor control means 18, and rotates in one direction or the other at variable speed, in accordance with the reel motor control signal output from processing means 12. Processing means 12 contains timer means 30.

The magnetic tape drive unit has reel-locking means 32, blower motor 34, blower control means 36, and alarm means 38, besides main processing means 22. Means 32 locks a supply reel set in a retainer, in response to a reel-locking instruction which main processing means 22 produces upon receipt of the reel detection signal supplied from reel-detecting means 14 through processing means 12. The supply reel is thereby prevented from slipping out of the retainer.

Blower control means 36 turns blower motor 34 on and off, rotating motor 34 at variable speed, according to the instruction supplied from main processing means 22. Since blower motor 34 can be rotated at variable speed, it can supply high-pressure air at different speeds, blowing the outer end portion of the magnetic tape on the supply reel to the tape takeup section of the magnetic tape drive unit.

Alarm means 38 includes means for generating sound or light in response to upside-down position data supplied from processing means 12 through main processing means 22, indicating that the tape supply reel has been positioned upside down. Processing means 12 gives the upside-down position data to main processing means 22 when tape supply-detecting means 16 does not detect a specific condition (later described in detail).

Figure 2:
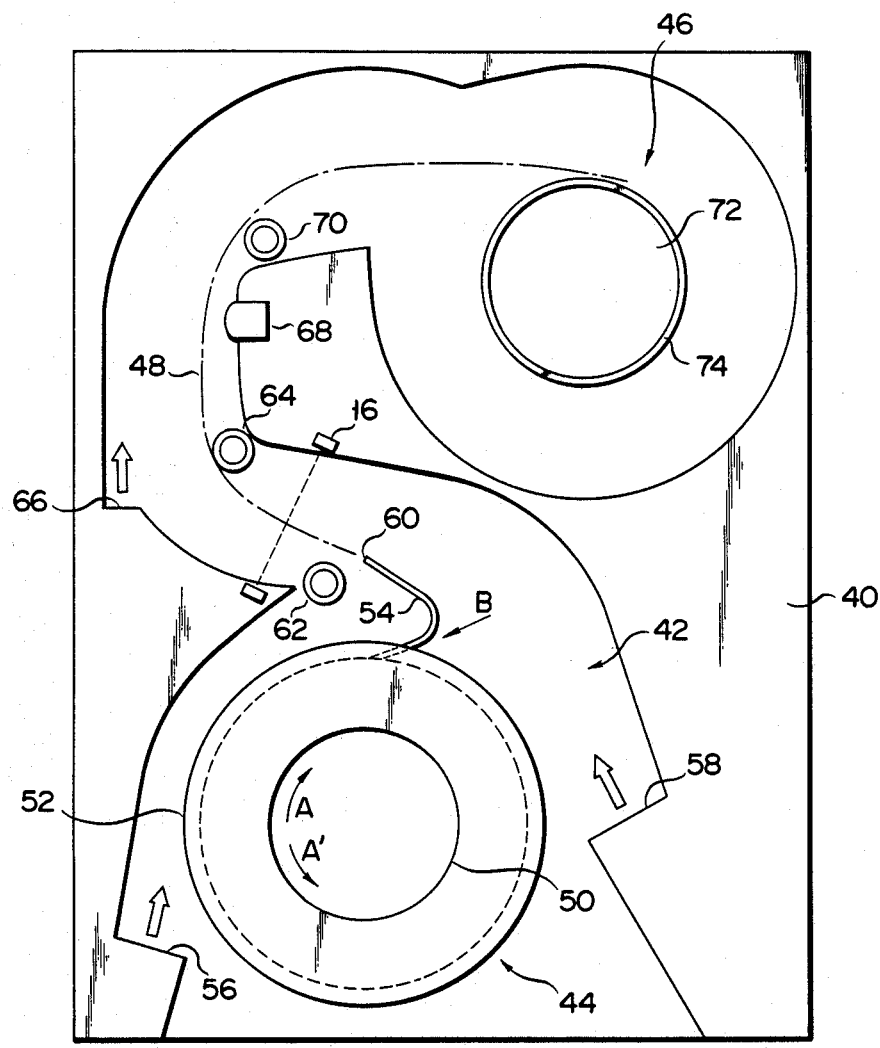
FIG. 2 is a plan view showing the magnetic tape drive unit.

FIG. 2 is a plan view of the magnetic tape drive unit shown in FIG. 1, not showing the top cover of the unit. As shown in FIG. 2, the unit comprises a die-cast base 40 positioned horizontally. Recess 42 is cut in the upper surface of base 40. Tape supply section 44, tape takeup section 46, and tape path 48 are provided in recess 42. Sections 44 and 46 are located in lower and upper positions in FIG. 2, and tape path 48 extends between sections 44 and 46.

Reel retainer 50 is provided in supply section 44. Supply reel 52, around which magnetic tape 54 is wound, is set in retainer 50. When supply reel 52 is set in retainer 50, reel-detecting means 14 detects this fact, whereupon reel-locking means 32 locks reel 52, thereby preventing it from moving out of retainer 50. Reel drive motor 28 rotates retainer 50 in the direction of arrow A', opposite to the direction of arrow A in which magnetic tape 54 is supplied. Reel-detecting means 14, reel-locking means 32, and reel drive motor 28 are not illustrated in FIG. 2.

First nozzle 56 for ejecting high-pressure air into tape path 48 is provided near retainer 50. Second nozzle 58 also for ejecting high-pressure air into tape path 48 is provided opposite first nozzle 56, with retainer 50 positioned in-between. The air streams from nozzles 56 and 58 blow the outer end portion 60 of tape 54 from supply reel 52 into tape path 48 and further move end portion 60 along tape guide 62 located in the vicinity of retainer 50 and at the inlet of tape path 48.

Tape supply-detecting means 16 is arranged in tape path 48 and is close to the inlet thereof. When means 16 detects the specific condition (later described), retainer 50 is rotated in the reverse direction, i.e., the direction of arrow A, thereby supplying outer end portion 60 through tape path 48, along tape guide 62.

At the midpoint in tape path 48, third nozzle 66 is provided to eject high-pressure air to tape takeup section 46. Outer end portion 60 of tape 54 is therefore guided to tape takeup section 46 by magnetic head 68 and tape guide 70.

Tape takeup section 46 has hub 72 having vertical slot 74. The air pressure within hub 72 is maintained at a level lower than the air pressure in tape path 48. Hence, air is sucked into hub 72 through vertical slot 74. The end of tape 54 is drawn into slot 74. Thereafter, tape 54 is wound around hub 72 as hub 72 is rotating.

The high-pressure air ejected from nozzles 56, 58, and 66 is supplied from blower motor 34.

Figure 3:
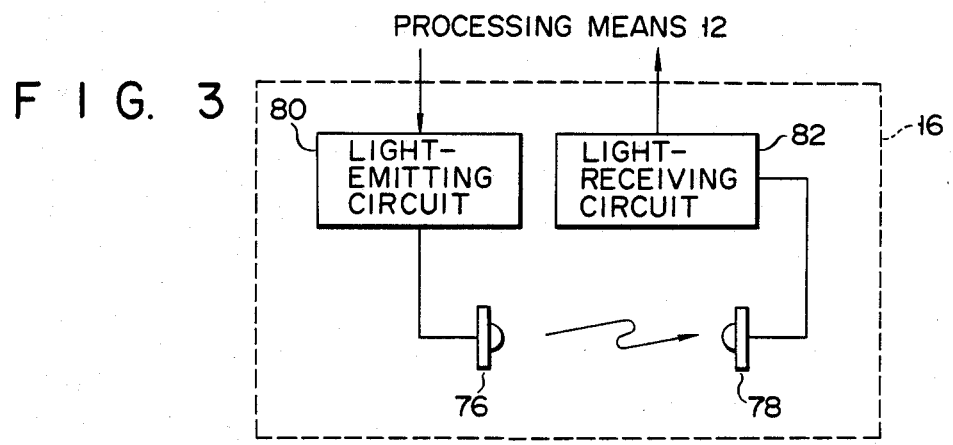
FIG. 3 is a block diagram of a means for detecting the supply of magnetic tape.

FIG. 3 is a block diagram showing tape supply-detecting means 16. As shown in this figure, means 16 is a photo-interrupter comprising element 76 for emitting light and element 78 for receiving the light emitted from element 76. Light-emitting element 76 is connected to light-emitting circuit 80, and light-receiving element 78 is coupled to light-receiving circuit 82. Circuits 80 and 82 are connected to processing means 12. The light beam from element 76 is interrupted when magnetic tape 54 is supplied through tape path 48. Therefore, the supply of tape 54 can be detected from the output of light-receiving circuit 82.

Figure 4:
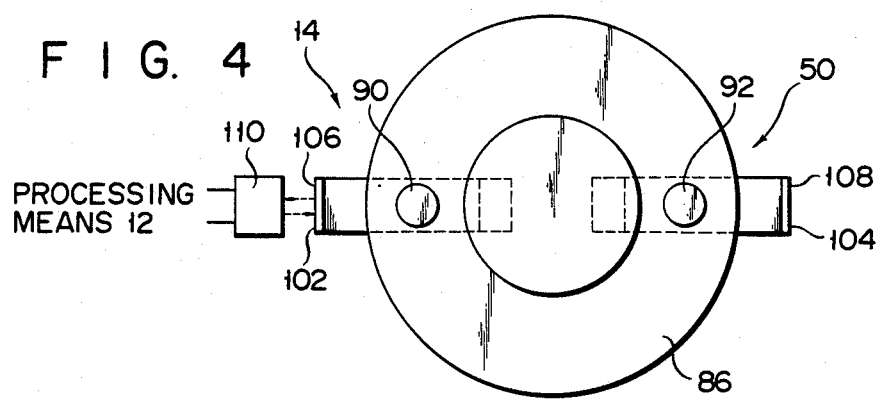
FIG. 4 is a plan view of the retainer provided in the tape supply section.
Figure 5:
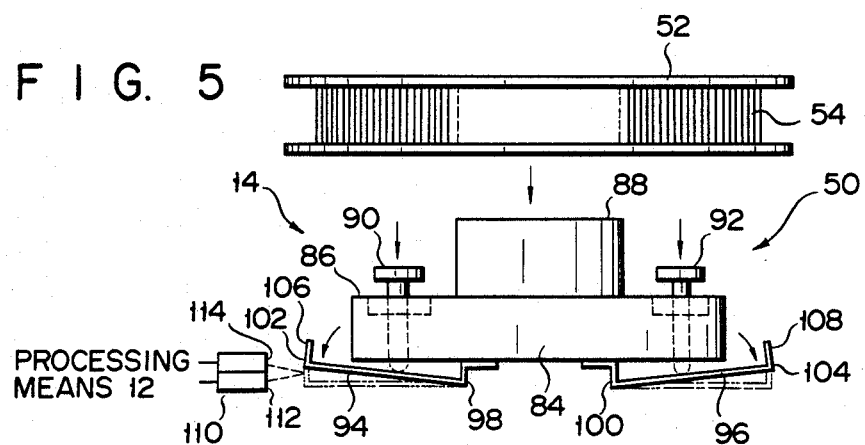
FIG. 5 is a side view of the retainer.

FIGS. 4 and 5 are, respectively, a plan view and a side view of retainer 50 of tape supply section 44. Retainer 50 comprises turntable 84 which can be rotated by reel drive motor 28. The upper surface of turntable 84 is reel-supporting plane 86 in which tape supply reel 52 is positioned. Projection 88 protrudes upward from the center portion of turntable 84. Projection 88 is inserted in a hub of tape supply reel 52 when tape supply reel 52 is set in retainer 50.

Reel-detecting means 14 is mounted on turntable 84. More specifically, pins 90 and 92 are slidably inserted in the vertical holes cut in turntable 84 and are spaced equidistantly from the axis of turntable 84. Leaf springs 94 and 96 are located below turntable 84. Springs 94 and 96 have, on one end, respective proximal end portions 98 and 100. The other respective end portions 102 and 104 of springs 94 and 96, are bent at right angles, and upwardly urge pins 90 and 92, respectively. Hence, pins 90 and 92 upwardly protrude from reel-supporting plane 86.

Reflectors 106 and 108 are secured to end portions 102 and 104 of springs 94 and 96. Photo-interrupter 110 is attached to base 40 and is electrically connected to processing means 12.

Pins 90 and 92 are pushed down when tape supply reel 52 is set in retainer 50, lowering leaf springs 94 and 96. Reflectors 106 and 108 attached to springs 94 and 96, are thereby lowered, too. In their lower positions, reflectors 106 and 108 reflect the light from light-emitting section 112 of photo-interrupter 110 to light-receiving element 114 of the photo-interrupter 110. Upon receipt of this light, photo-interrupter 110 supplies a reel-detection signal to processing means 12, thereby indicating that tape supply reel 52 has been set in retainer 50. Then, reel-locking means 32 locks tape supply reel 52, thereby preventing reel 52 from slipping out of retainer 50.

Figure 6:
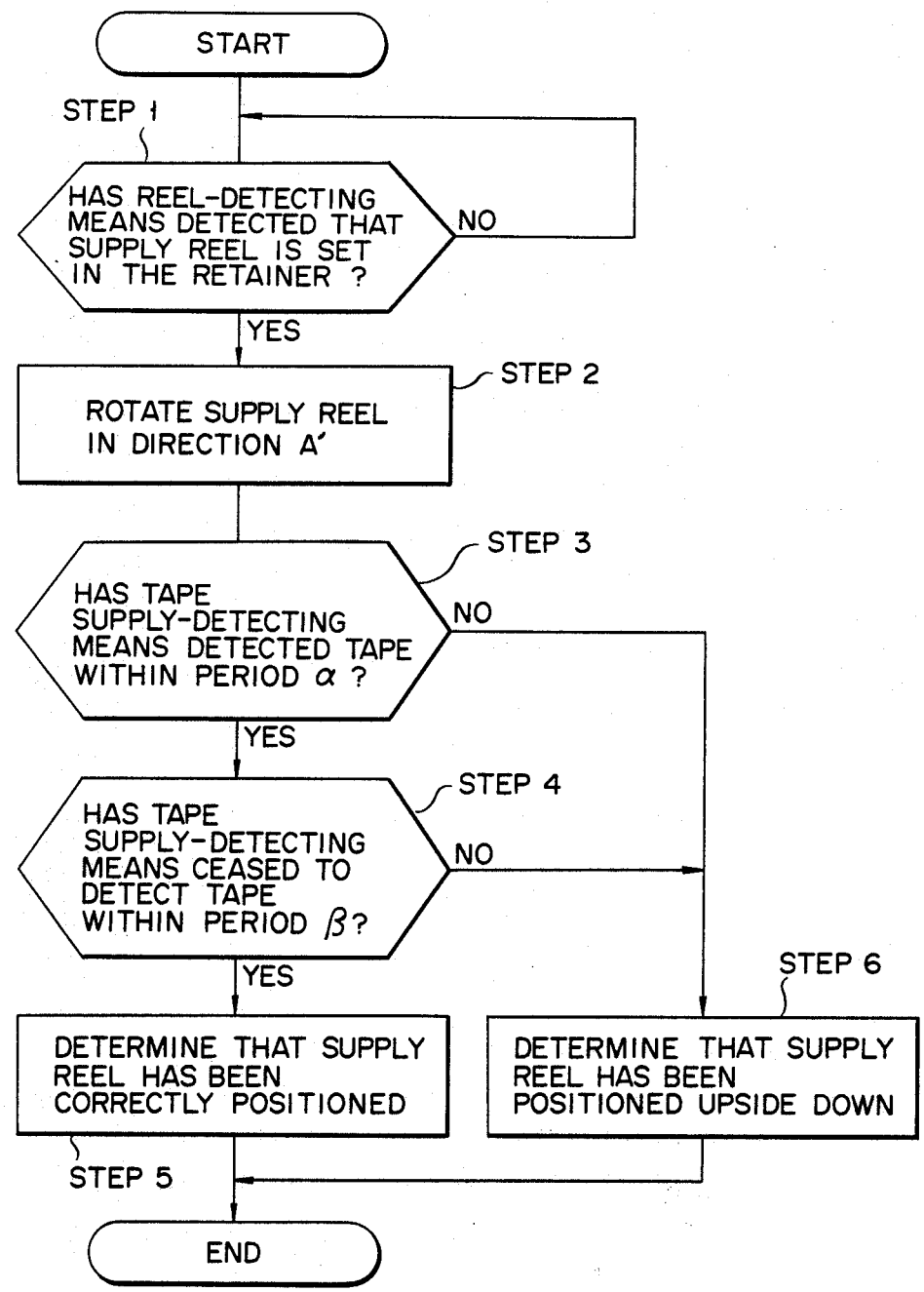
FIG. 6 is a flow chart explaining the operation of the reel position-detecting device shown in FIG. 1.

FIG. 6 is a flow chart explaining how device 10 detects that tape supply reel 52 has been mistakenly positioned upside down. In step 1, it is determined whether or not tape supply reel 52 has been set in retainer 50. When reel-detecting means 14 detects reel 52, processing means 12 supplies a drive signal through reel motor control means 18 to reel drive means 20, in step 2. As a result, retainer 50 is rotated in the direction of arrow A' (FIG. 2), thereby pulling outer end portion 60 of tape 54. Simultaneously, timer means 30 provided within processing means 12 starts to measure the time, and processing means 12 supplies the reel-detection signal supplied from reel-detecting means 14 to main processing unit 22. Main processing means 22 accordingly drives blower motor 34, whereby nozzles 56 and 58 eject high-pressure air into tape path 48, and nozzle 66 ejects high-pressure air to tape takeup section 46.

Let us assume that tape supply reel 52 is correctly positioned in retainer 50. Outer end portion 60 of tape 54 is blown by the air supplied from first and second nozzles 56 and 58 and successfully peels off reel 52 at point B (FIG. 2) while reel 52 is rotating in the direction of arrow A' (FIG. 2). End portion 60 moves through tape path 48, guided by tape guide 62. In step 3, it is determined whether or not tape supply-detecting means 16 has detected tape 54 within the predetermined period α. If YES, timer means 30 is reset and starts counting down a predetermined period β. When supply reel 52 continues to rotate in the direction of arrow A', tape 54 is wound around reel 52, whereby tape supply-detecting means 16 cannot detect tape 54. In step 4, it is determined whether or not means 16 has ceased detecting tape 54 within period β. If YES, reel 52 is considered to have been set in retainer 50, in step S5, and the automatic loading of tape is continued.

It is only when reel 52 has been positioned correctly that means 16 ceases to detect magnetic tape 54 within period β after it has detected tape 54. Hence, when tape supply-detecting means 16 ceases detecting tape 54 within period β, processing means 12 supplies a "correct position" signal to main processing means 22. In response to this signal, main processing means 22 supplies a control signal to reel motor control means 18, whereby retainer 50 is rotated by reel drive motor 28 in the direction of arrow A, thus feeding magnetic tape 54 through tape path 48. Tape 54 is eventually taken up around hub 72 of tape takeup section 46.

Reel drive motor 28 starts rotating retainer 50 in the direction of arrow A before magnetic tape 54 goes out of contact with tape guide 62, or when means 16 detects tape 54 again. Periods α and β are changed in accordance with the position of tape supply-detecting means 16 and the rotational speed of retainer 50.

Let us assume that tape supply reel 52 is mistakenly positioned upside down in retainer 50. End portion 60 of tape 54 is blown by the air supplied from first and second nozzles 56 and 58, peels off reel 52 at a point other than point B (FIG. 2), and accumulates in one place. Tape supply-detecting means 16 therefore cannot detect tape 54 within period α. Hence, NO in step 3, and in step 6 it is determined that tape supply reel 52 has been positioned upside down. Processing means 12 therefore supplies an "upside-down" position signal to main processing means 22. In response to this signal, means 22 stops reel drive motor 28 and blower motor 34. Simultaneously, means 22 drives alarm means 38, thereby informing the user that reel 54 has been positioned upside down in retainer 50.

Even if tape 54 peels off reel 52 at point B and this is detected by tape supply-detecting means 16, it cannot be taken up by reel 52 when reel 54 is positioned upside down. Therefore, NO in step 4. The flow goes to step 6, in which it is determined that tape supply reel 52 has been positioned upside down. Processing means 12 therefore supplies an "upside-down" position signal to main processing means 22. In response to this signal, means 22 stops reel drive motor 28 and blower motor 34. Simultaneously, means 22 drives alarm means 38, thereby informing the user that reel 54 has been set upside down in retainer 50.

As described above, processing means 12 determines whether reel 52 has been positioned correctly or upside down, based on the output data of tape supply-detecting means 16 which detects the specific state of tape 54 only when reel 52 has been positioned correctly.

Figure 7:
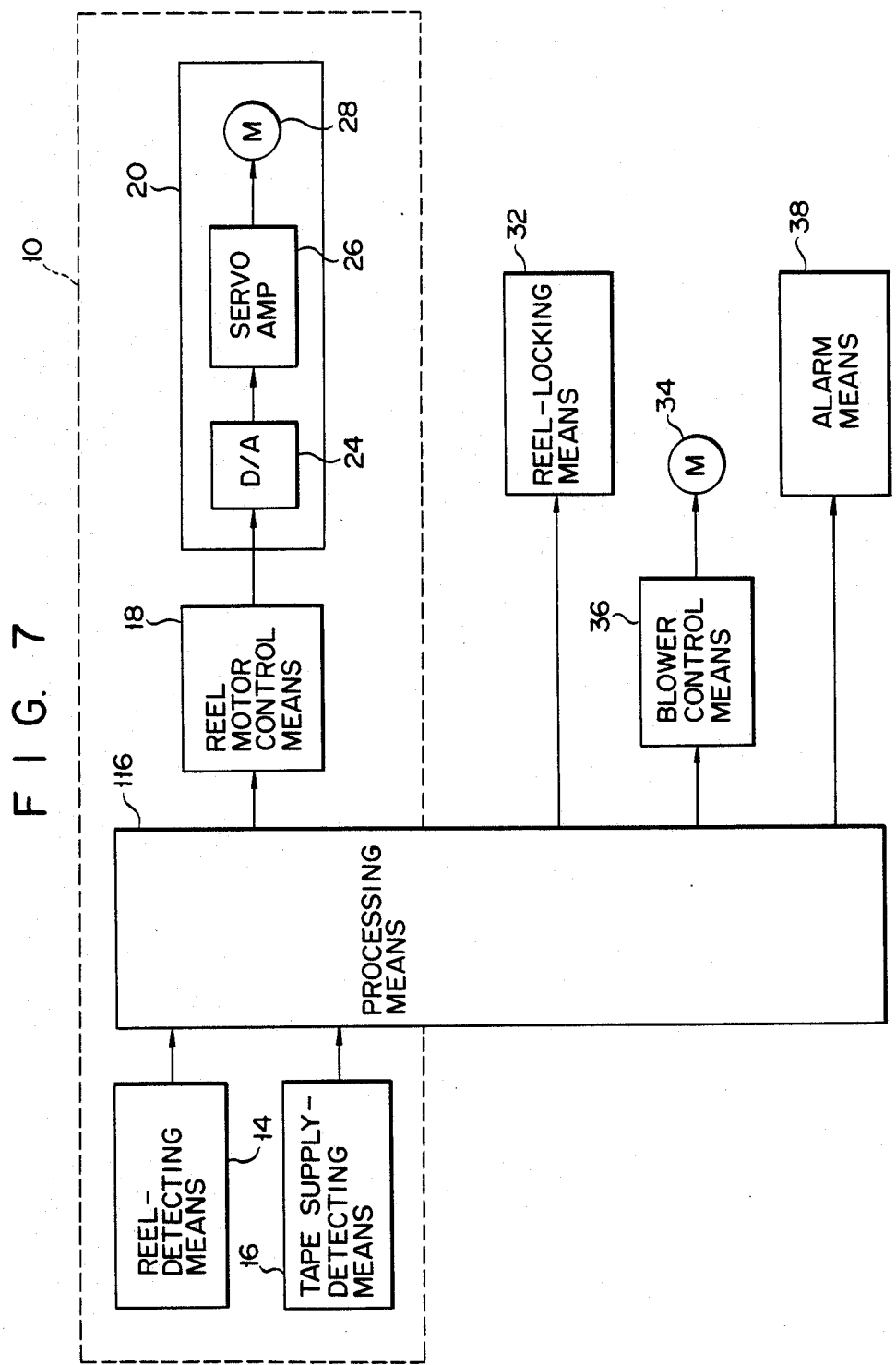
FIG. 7 is a block diagram of another embodiment of a magnetic tape drive unit provided with a reel position-detecting device according to the invention.

As shown in FIG. 7, processing means 12 and main processing means 22 can be combined into one processing means 116. Further, it is possible to determine whether reel 52 has been positioned correctly or upside down, in accordance with the number of rotations of retainer 50, which can be detected by reel-detecting means 14, and not based on whether tape supply-detecting means 16 detects tape 54 within period α, or whether or not means 16 ceases detecting tape 54 within period β.

Figure 8:
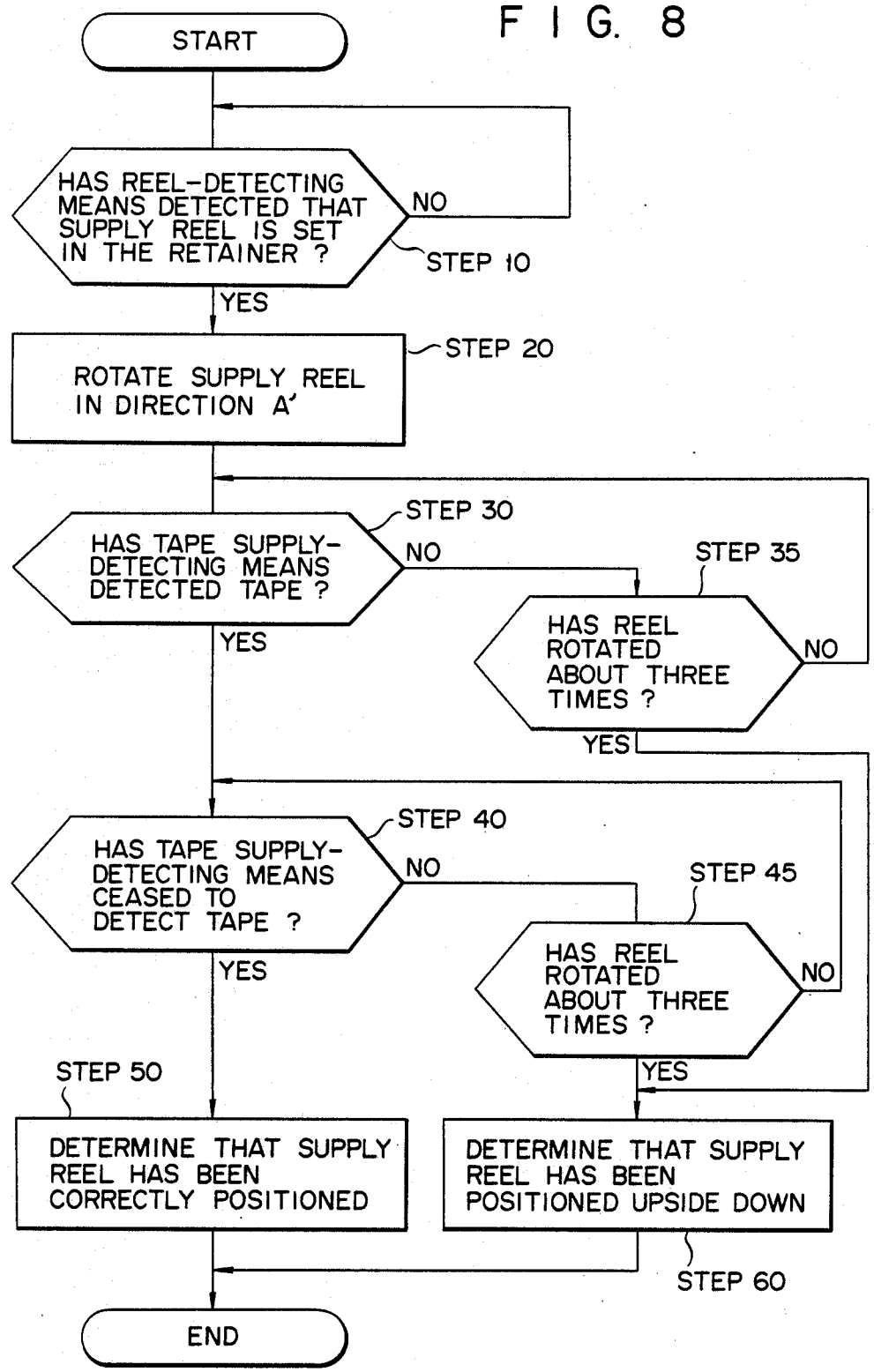
FIG. 8 is a flow chart explaining the operation of the reel position-detecting device shown in FIG. 7.

FIG. 8 is a flow chart explaining how the position of reel 52 is determined on the basis of the number of rotations of retainer 50. In step 10, it is determined whether or not reel-detecting means 14 has detected tape supply reel 52 set in retainer 50. If YES, processing means 116 supplies a control signal to reel motor control means 18, in step 20, whereby reel drive means 20 drives reel drive motor 28, thereby rotating retainer 50 in the direction of arrow A' (FIG. 2). Simultaneously, processing means 116 supplies a control signal to blower control means 36, whereby blower motor 34 is driven and nozzles 56, 58, and 66 eject high-pressure air. Then, in step 30, it is determined whether or not tape supply-detecting means 16 has detected tape 54. If NO, it is determined in step 35 whether or not retainer 50 has rotated about three times. If NO, the flow returns to step 30. When means 16 detects tape 54 before retainer 50 rotates about three times, it is determined in step 40 whether or not means 16 has ceased detecting tape 54. If NO, the flow goes to step 45, in which it is determined whether or not retainer 50 has rotated about three times. If NO, the flow returns to step 40. When tape supply-detecting means 16 ceases detecting tape 54 before retainer 50 has rotated about three times, it is determined in step 50 that tape supply reel 52 has been positioned correctly, and the automatic loading of tape is continued.

If YES in step 35 or 45, the flow goes to step 60, in which it is determined that tape supply reel 52 has been mistakenly positioned upside down. In this case, processing means 116 stops reel drive motor 28 and blower motor 34, and drives alarm means 38, thereby informing the user that reel 52 has been mistakenly positioned upside down.

Reel-detecting means 14 can have various structures different from that described above. For instance, it can comprise a ring surrounding retainer 50, an annular reflector provided on the outer periphery of the ring, and a photo-interruptor.

What is claimed is:

1. A reel position-detecting device for use in a magnetic tape drive unit wherein magnetic tape is automatically taken up from a supply reel set in a retainer to a takeup section, said device being designed for detecting that the supply reel has been mistakenly set upside down in a retainer, and comprising:

reel-detecting means for detecting whether or not the supply reel has been set in the retainer, and for generating a reel-detection signal upon detecting that the supply reel has been set in the retainer;

tape supply-detecting means provided near the retainer and in a tape path extending from the retainer to the takeup section, for detecting whether or not the magnetic tape is being supplied through the tape path, and for generating a tape-detection signal upon detecting that the magnetic tape is being supplied through the tape path;

reel drive means for rotating the retainer, thereby rotating the supply reel set in the retainer; and processing means responsive to the reel-detection signal, for controlling the reel drive means, to rotate the retainer in such direction that the magnetic tape is taken up by the supply reel, and for determining that the supply reel has been positioned correctly, when the tape-detection signal disappears within a predetermined period as the retainer is rotated, and determining that the supply reel has been positioned upside down, when the tape detection signal persists beyond said period.

2. The device according to claim 1, wherein said processing means further determines that the supply reel has been positioned upside down, also when the tape supply-detecting means continues to generate the tape detection signal upon the lapse of a predetermined period after the retainer has started rotating.

3. The device according to claim 2, wherein said processing means has a timer means for measuring said predetermined period.

4. The device according to claim 2, wherein said reel-detecting means has a photo-interrupter including a light-emitting section and a light-receiving section, and reflector means for reflecting the light from the light-emitting section to the light-receiving section only when the supply reel is set in the retainer.

5. The device according to claim 4, wherein said reflector means is attached to a turnable rotated by the reel drive means and designed to support the supply reel, and has leaf springs provided below the turnable, pins which are urged upward by the leaf springs and which protrude from the upper surface of the turntable, and reflectors attached to the leaf springs, for reflecting the light from the light-emitting section when the supply reel is set in the retainer, thereby pushing down the pins, and the leaf springs are therefore pushed down.

6. The device according to claim 5, wherein said processing means determines, by means of the reel detection signal, how many times the supply reel has rotated, and determines that the predetermined period has expired, when the supply reel has rotated a predetermined number of times.

7. The device according to claim 2, wherein said tape supply-detecting means has a light-emitting means and a light-receiving means, and generates the tape-detection signal when the magnetic tape interrupts the light from the light-emitting means.

8. A magnetic tape drive unit comprising:

a retainer for supporting a supply reel with magnetic tape wound about it;

a takeup section for taking up the magnetic tape from the supply reel;

a tape path provided between the retainer and the takeup section for supplying the magnetic tape;

tape supply means for automatically supplying the magnetic tape from the supply reel to the takeup section via the tape path;

reel-detecting means for detecting whether or not the supply reel has been set in the retainer, and for generating a reel-detection signal upon detecting that the supply reel haas been set in the retainer;

tape supply detecting means provided near the retainer and in a tape path, for detecting whether or not the magnetic tape is being supplied through the tape path, and for generating a tape-detection signal upon detecting that the magnetic tape is being supplied through the tape path;

reel drive means for rotating the retainer, thereby rotating the supply reel set in the retainer;

first processing means responsive to the reel detection signal, for controlling the reel drive means, to rotate the retainer in such a direction that the magnetic tape is taken up by the supply reel, and for determining that the supply reel has been positioned correctly, when the tape-detection signal disappears within a predetermined period as the retainer is rotated, thereby generating a signal indicating that the supply reel has been positioned correctly, and for determining that the supply reel has been positioned upside down, when the tape-detection signal persists beyond said period, thereby generating a signal indicating that the supply reel has been positioned upside down; and second processing means for controlling, in response to the signal indicating that the supply reel has been positioned correctly, the reel drive means, to rotate the supply reel in such a direction that the magnetic tape is supplied to the takeup section, and for controlling, in response to the signal indicating that the supply reel has been positioned upside down, the reel drive means, to stop the supply reel.

9. The unit according to claim 8, further comprising alarm means controlled by the second processing means, to inform that the supply reel has been positioned upside down.

10. The unit according to claim 9, wherein said first processing means determines that the supply reel has been positioned upside down, when the tape-detection signal continues to be generated upon the lapse of a predetermined period after the retainer has started rotating.

11. The unit according to claim 10, wherein said first processing means has a timer means means for measuring said predetermined period.

12. The unit according to claim 11, wherein said first and second processing means are combined into one processing means.

13. The unit according to claim 10, wherein said reel-detecting means has a photo-interrupter including a light-emitting section and a light-receiving section, and reflector means for reflecting the light from the light-emitting section to the light-receving section only when the supply reel is set in the retainer.

14. The unit according to claim 13, wherein said reflector means is attached to a turntable rotated by the reel drive means and designed to support the supply reel, and has leaf springs provided below the turntable, pins which are urged upward by the leaf springs and which protrude from the upper surface of the turntable, and reflectors attached to the leaf springs, for reflecting the light from the light-emitting section when the supply reel is set in the retainer, thereby pushing down the pins, and the leaf springs are therefore pushed down.

15. The unit according to claim 14, wherein said first processing means determines, by means of the reel-detection signal, how many times the supply reel has rotated, and determines that the predetermined period has expired, when the supply reel has rotated a predetermined number of times.

16. The unit according to claim 15, wherein said first and second processing means are combined into one processing means.

17. The unit according to claim 10, wherein said tape supply-detecting means has a light-emitting means and a light-receiving means, and generates the tape-detection signal when the magnetic tape interrupts the light from the light-emitting means.

18. The unit according to claim 15, wherein said first and second processing means are combined into one processing means.

19. A method of detecting that a supply reel has been mistakenly set upside down in a retainer in a magnetic tape drive unit wherein magnetic tape is automatically taken up from the supply reel set in the retainer to a takeup section, said method comprising the steps of:
generating a reel-detection signal when the supply reel has been set in the retainer;
generating a tape-detection signal when the magnetic tape is detected to be at a point near the retainer and in a tape path extending from the retainer to the takeup section;
rotating the retainer in response to the tape-detection signal, thereby rotating the supply reel set in the retainer to take up the magnetic tape; and
determining that the supply reel has been positioned correctly, when the tape-detection signal disappears within a predetermined period as the retainer is rotated, and determining that the supply reel has been positioned upside down, when the tape detection signal persists beyond said period.

20. The method according to claim 18, wherein the step of determining that the supply reel has been positioned upside down includes the step of determining this fact when the tape-detection signal continues to be generated upon the lapse of a predetermined period after the retainer has started rotating.

21. The method according to claim 20, wherein the predetermined period is measured by a timer means.

22. The method according to claim 20, wherein the reel-detection signal is generated by reel-detecting means having a photo-interrupter including a light-emitting section and a light-receiving section, and reflector means for reflecting the light from the light-emitting section to the light-receiving section only when the supply reel is set in the retainer.

23. The method according to claim 22, wherein said reflector means is attached to a turntable rotated by the reel drive means and designed to support the supply reel, and has leaf springs provided below the turntable, pins which are urged upward by the leaf springs and which protrude from the upper surface of the turntable, and reflectors attached to the leaf springs, for reflecting the light from the light-emitting section when the supply reel is set in the retainer, thereby pushing down the pins, and the leaf springs are therefore pushed down.

24. The method according to claim 23, wherein the step of determining the position of the supply reel consists of determining, by means of the reel-detection signal, how many times the supply reel has rotated, and determining that the predetermined period has expired, when the supply reel has rotated a predetermined number of times.

25. The method according to claim 20, wherein the tape-detection signal is generated by tape supply-detecting means having a light-emitting means and a light-receiving means, when the magnetic tape interrupts the light from the light-emitting means.

* * * * *